(12) United States Patent
Kato et al.

(10) Patent No.: US 6,556,256 B1
(45) Date of Patent: Apr. 29, 2003

(54) PROJECTOR AND PRISM USED THEREIN

(75) Inventors: Hisamaro Kato, Matsumoto (JP);
Kazuhiro Nishida, Matsumoto (JP);
Tomiyoshi Ushiyama, Minowa-machi (JP); Takeshi Takizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/516,629

(22) Filed: Mar. 1, 2000

(30) Foreign Application Priority Data

Mar. 2, 1999 (JP) .......................................... 11-054408

(51) Int. Cl.$^7$ ................................................ H04N 5/74
(52) U.S. Cl. ...................... 348/781; 352/109; 359/833; 353/81
(58) Field of Search ................................. 348/771, 781; 352/113, 109; 353/33, 81, 98; 359/640, 639, 831, 833, 834

(56) References Cited

U.S. PATENT DOCUMENTS

| | | | |
|---|---|---|---|
| 4,969,730 A | | 11/1990 | van den Brandt |
| 5,386,250 A | | 1/1995 | Guerinot |
| 5,420,655 A | | 5/1995 | Shimizu |
| 5,467,146 A | | 11/1995 | Huang et al. |
| 5,865,520 A | * | 2/1999 | Kavanagh et al. ............ 353/31 |
| 5,905,545 A | * | 5/1999 | Poradish et al. ............ 348/243 |
| 6,250,763 B1 | * | 6/2001 | Fielding et al. ............... 353/31 |

FOREIGN PATENT DOCUMENTS

DE  3901 166 A1  7/1990

OTHER PUBLICATIONS

Abstract—Application No. 00301686.2, Seiko Epson Corporation.

* cited by examiner

Primary Examiner—Victor R. Kostak
(74) Attorney, Agent, or Firm—Oliff & Berridge, PLC

(57) ABSTRACT

A projector of the type which uses an optical modulator that modulates light by controlling the emitting direction of light applied to a light illumination surface in accordance with image information is provided with a reduction in size. In the projector a prism has a selective reflection/transmission surface which reflects illumination light emitted from an illumination optical system and impinging thereupon, and causes the illumination light to impinge upon the light illumination surface of an optical modulator at a predetermined angle. The prism allows the modulated light emitted from the optical modulator to be transmitted therethrough and emits the light to the projection optical system. The selective reflection/transmission surface is formed such that when the optical path of the illumination light is projected onto a plane parallel to the light illumination surface, the inclination of the central axis of the illumination light emitted from the illumination optical system and impinging upon the selective reflection/transmission surface is different from the inclination of the central axis of the illumination light reflected by the selective reflection/transmission surface and impinging upon the light illumination surface.

11 Claims, 11 Drawing Sheets

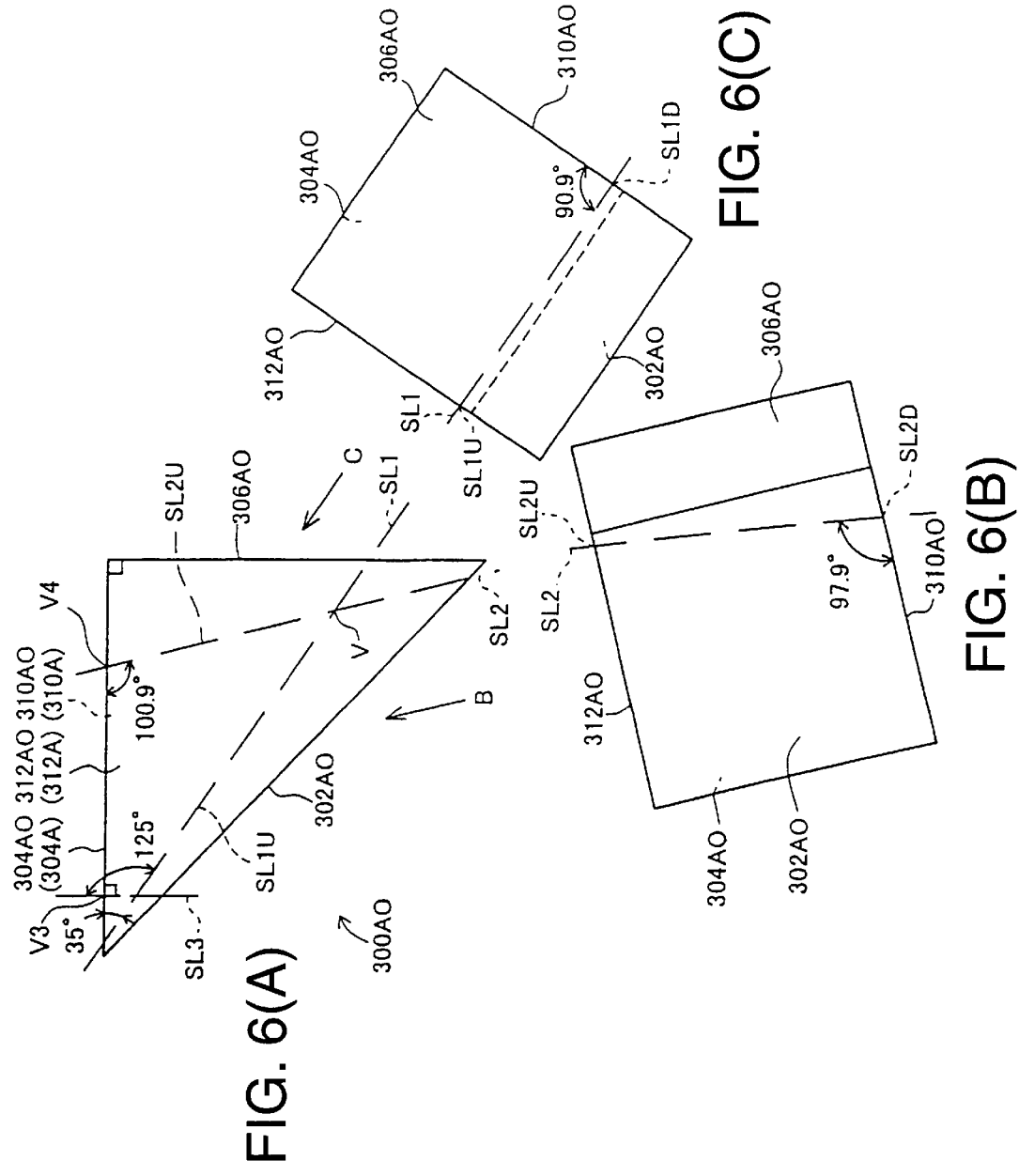

FIG.7(A)
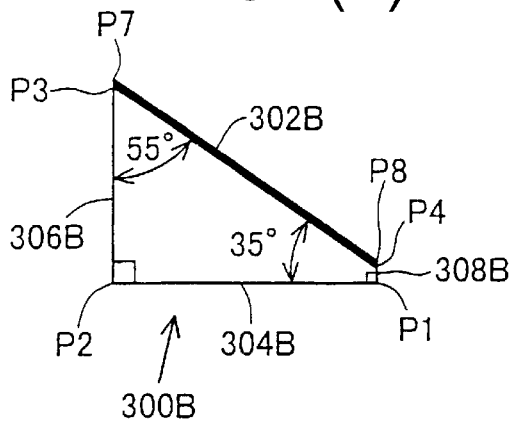
FIG.7(E)
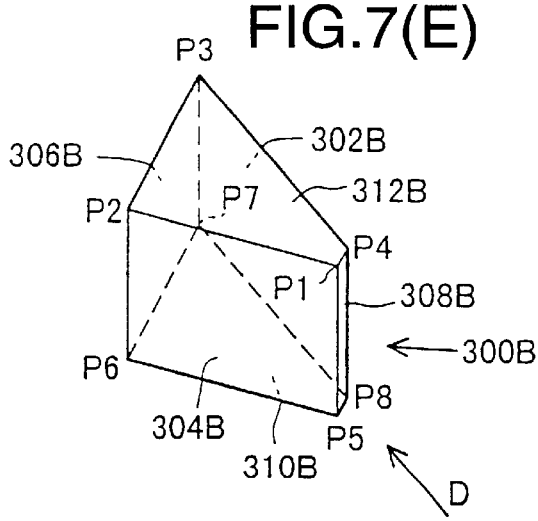
FIG.7(D)
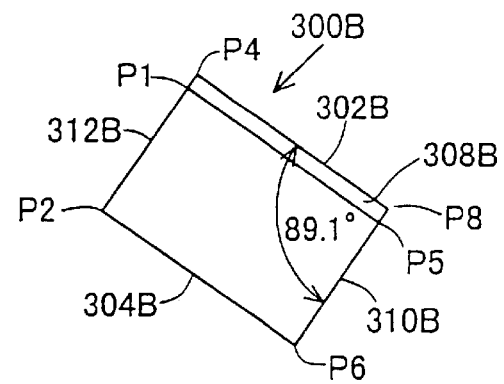
DIRECTION OF ARROW D
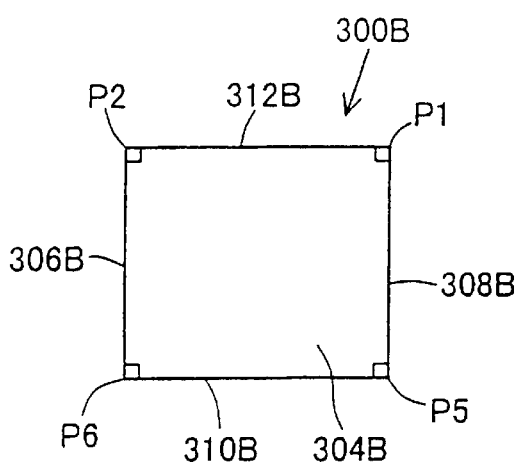
FIG.7(B)
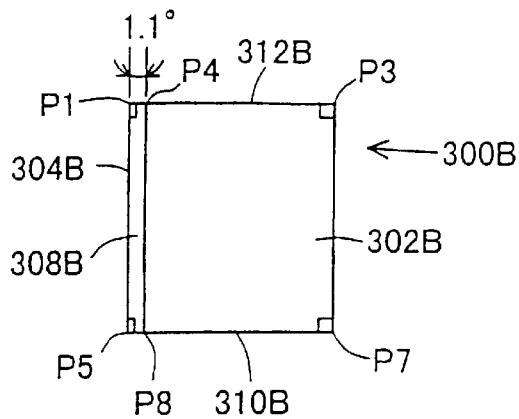
FIG.7(C)

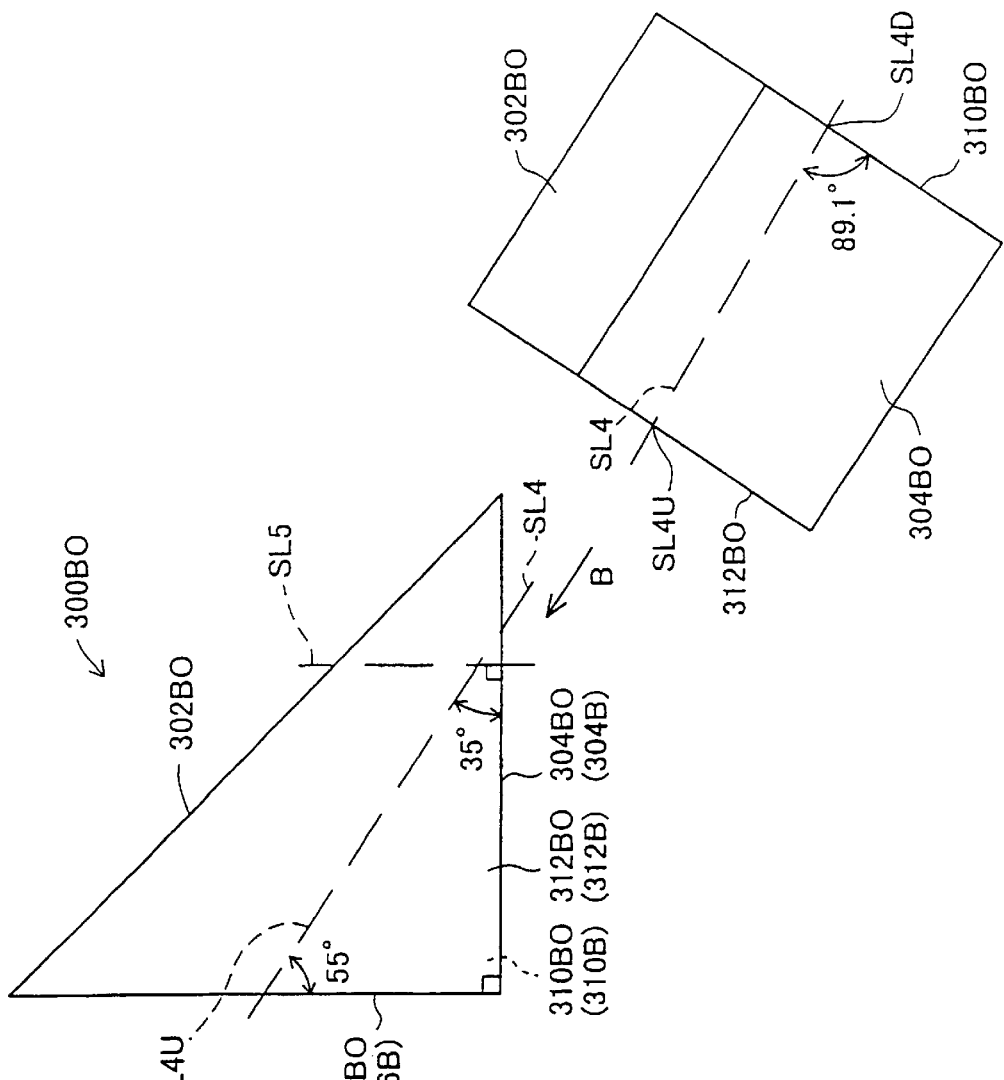

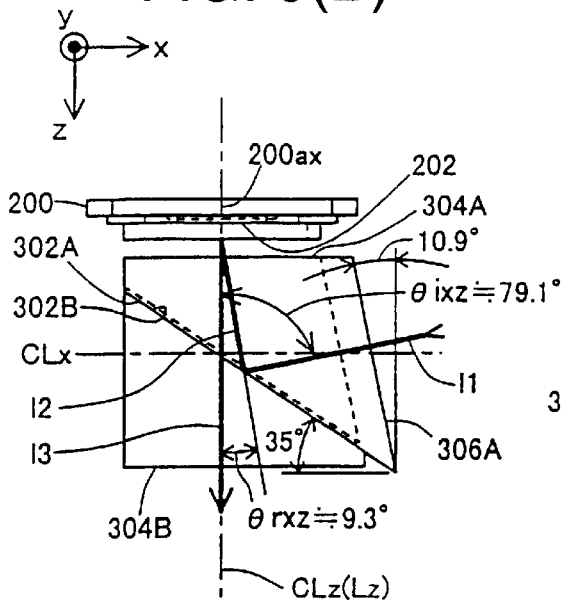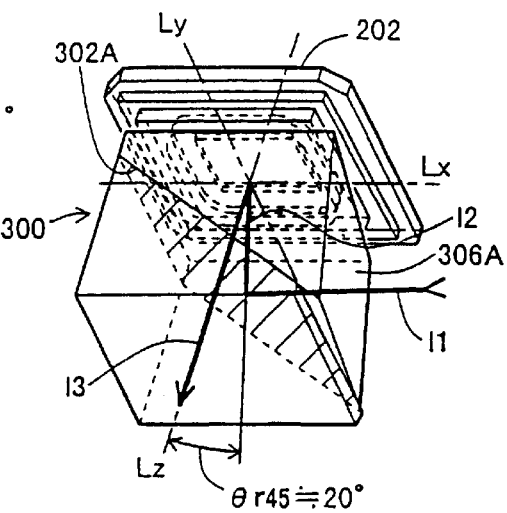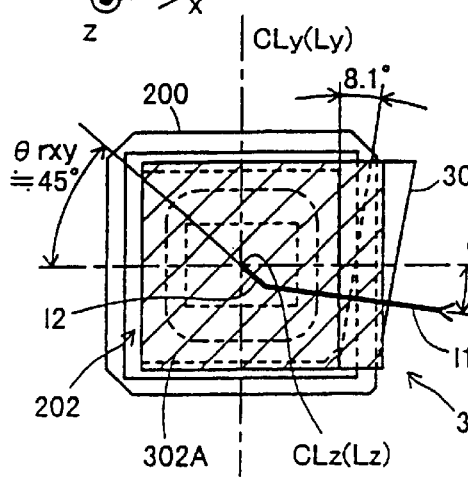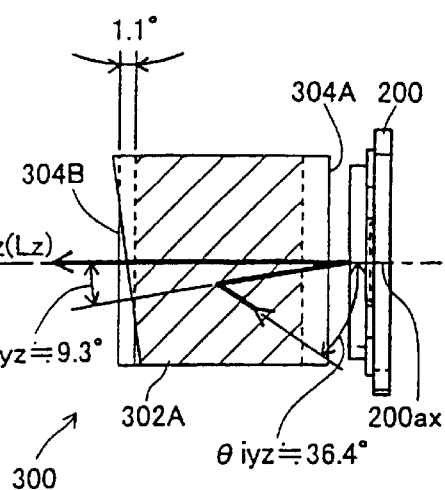

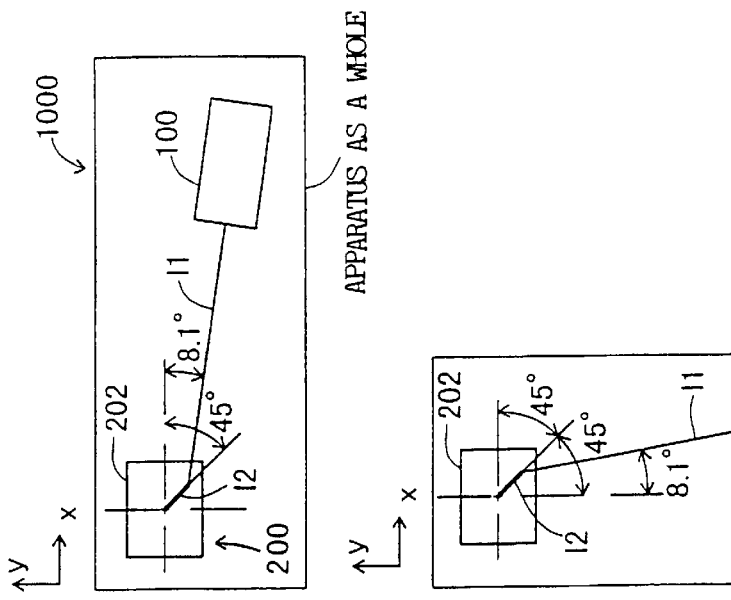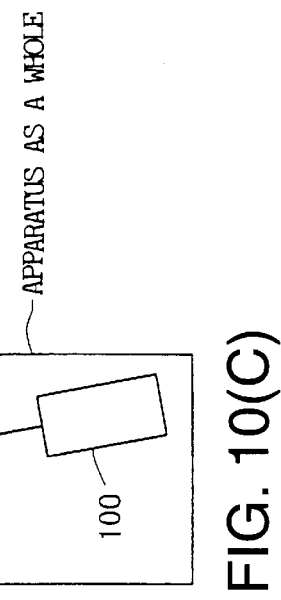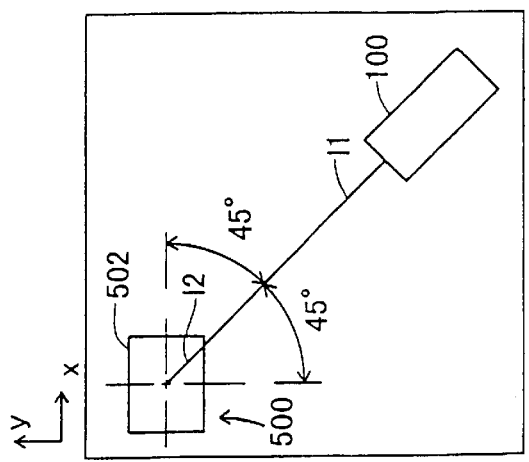

PROJECTOR AND PRISM USED THEREIN

BACKGROUND OF THE INVENTION

1. Field of Invention

The present invention relates to a projector that projects images to display the images, and to a prism used therein.

2. Description of Related Art

In a projector, modulated light is formed by using an electro-optic device, and this modulated light is projected to display an image. Generally speaking, an "electro-optic device" is a device for converting an electric signal representing image information to modulated light. As this electro-optic device, an optical modulator which modulates light by controlling the emitting direction of illumination light applied to each pixel according to image information or the like is used. An example of this optical modulator is a micro-mirror type optical modulator such as the digital micro-mirror device (a trade mark of TI (Texas Instruments, Co.), hereinafter referred to as "DMD").

The DMD has a plurality of micro-mirrors corresponding to a plurality of pixels forming an image. The inclination of each of the plurality of micro-mirrors varies according to image information. The light is reflected according to the inclination of each micro-mirror. Of the light reflected by each micro-mirror, light reflected in a predetermined direction is utilized as the light for forming an image.

FIGS. 11(A)–(D) are diagrams illustrating the DMD and prism in a conventional projector. FIGS. 11(A), 11(B), 11(C) and 11(D) are a front view, a plan view, a right side view, and a perspective view, respectively. A prism 600 is arranged in the proximity of a light illumination surface 502 of a DMD 500. An axis parallel to a central axis 500ax perpendicular to the light illumination surface 502 of the DMD 500 is the z-axis, and the direction from the DMD 500 to the prism 600 is the normal direction. Further, of the axes which are perpendicular to the z-axis and orthogonal to each other, the horizontal axis is the x-axis and the vertical axis is the y-axis.

In the following description, to facilitate the illustration, the illumination light incident on the center of the light illumination surface 502 will be described. That is, in the following description, each illumination light indicates the central beam (central axis) of each illumination light. Illumination light I1 emitted from an illumination optical system (not shown) impinges upon the prism 600. The illumination light I1 incident on the prism 600 undergoes total reflection at the selective reflection/transmission surface 620 of the prism 600. Illumination light I2 which has undergone total reflection at the selective reflection/transmission surface 620 is applied to the light illumination surface 502 of the DMD 500. The DMD 500 reflects the illumination light I2 applied to the light illumination surface 502 according to image information. Of the illumination light reflected by the DMD 500, illumination light I3 reflected in the z-direction is utilized as the light representing the image. The to illumination light I3 emitted from the DMD 500 impinges upon the prism 600, is transmitted through the selective reflection/transmission surface 620, and emitted to the projection optical system (not shown). The light impinging upon the projection optical system is projected to display the image.

The inclination of each micro-mirror varies in a see-saw-like manner about an axis parallel to the M-axis of FIG. 11(A), in response to an electric signal. In order that each pixel may be switched on and off by this inclination of the micro-mirror, there is a predetermined restriction to the incident angle of the illumination light incident on the DMD. That is, as shown in FIG. 11(A), when the optical path of each illumination light is projected onto the xy-plane parallel to the light illumination surface 502, the optical path of the illumination light I2 incident on the light illumination surface 502 is set so as to be directed obliquely downward to the right at an angle of approximately 45 degrees with respect to the central axis Lx parallel to the x-axis. Further, as shown in FIG. 11(D), in the plane including the illumination light I2 and the modulated light I3, the incident angle of the illumination light I2 incident on the light illumination surface 502 is set so as to be approximately 20 degrees.

In the prism 600, to satisfy the above restriction, as shown in FIG. 11(A), when the optical path of the illumination light I1 incident on the selective reflection/transmission surface 620 is projected onto the xy-plane, it is set so as to be parallel to the optical path of the illumination light I2. Thus, the illumination optical system emitting the illumination light I1 is usually arranged obliquely downward to the right at an angle approximately 45 degrees. As a result, in the conventional projector using a DMD as the electro-optic device, a space is needed not only in the horizontal direction but only in the vertical direction as the space for arranging the illumination optical system, making it difficult to reduce the thickness of the projector.

SUMMARY OF THE INVENTION

It is an object of this invention to provide a technique for reducing the size of a projector of the type which uses an optical modulator which modulates light by controlling the emitting direction of light applied to the light illumination surface according to the image information, as in the case of a DMD.

To achieve the above object, there is provided, in accordance with the present invention, a projector which may consist of:

an illumination optical system that emits illumination light;

an optical modulator having a light illumination surface that controls an emerging direction of the light applied to the light illumination surface in accordance with image information to modulate the light applied to the illumination surface;

a projection optical system that projects light emitted from the optical modulator; and a prism provided between the optical modulator and the projection optical system.

The prism has a selective reflection/transmission surface that reflects the illumination light emitted from the illumination optical system to cause the illumination light to impinge upon the light illumination surface at a predetermined angle, and that transmits the light emitted from the optical modulator and that emits the light emitted from the optical modulator to the projection optical system. The selective reflection/transmission surface is formed such that, when the optical paths of the illumination light are projected onto a plane parallel to the light illumination surface, the inclination of the central axis of the illumination light emitted from the illumination optical system and impinging upon the selective reflection/transmission surface is different from the inclination of the central axis of the illumination light reflected by the selective reflection/transmission surface and impinging upon the light illumination surface.

In the projector of the present invention, the illumination optical system can be arranged such that, when the optical path of illumination light is projected onto a plane parallel to the light illumination surface, the inclination of the central axis of the illumination light emitted from the illumination optical system and impinging upon the selective reflection/transmission surface differs from the inclination of the central axis of the illumination light reflected by the selective reflection/transmission surface and impinging upon the light illumination surface, whereby the size of the projector can be reduced.

In the above projector, an arrangement may be adopted wherein the light illumination surface has a substantially rectangular contour. When an optical path of the illumination light is projected onto a plane parallel to the light illumination surface, the central axis of the illumination light reflected by the selective reflection/transmission surface and impinging upon the light illumination surface is inclined approximately 45 degrees with respect to a side of the contour of the light illumination surface.

In the conventional projector, when the optical path of the illumination light is projected onto a plane parallel to the light illumination surface, if the inclination of the central axis of the illumination light impinging upon the selective reflection/transmission surface is approximately 45 degrees with respect to the side of the contour of the light illumination surface, the largest space is required as the installation space for the illumination optical system. Thus, in the above projector, the reduction of the size of the apparatus is most effectively achieved.

In accordance with the present invention, there is provided a prism which reflects incident light from a first direction as reflected light in a second direction, and which transmits light incident from a third direction as transmitted light. The prism is provided with a light selective reflection/transmission surface that reflects the incident light from the first direction such that, when the optical paths of the incident light from the first direction and the reflected light are projected onto a predetermined plane, the inclination of the central axis of the incident light from the first direction is different from the inclination of the central axis of the reflected light.

By using the prism of the present invention in a projector, it is possible to obtain the same effect as that of the above projector.

BRIEF DESCRIPTION OF THE DRAWINGS

FIGS. 6(A)–(C) are diagrams illustrating a method of preparing the first prism column 300A.

FIGS. 7(A)–(E) are diagrams illustrating the construction of the second prism column 300B.

FIGS. 8(A)–(B) are diagrams illustrating a method of preparing the second prism column 300B.

FIGS. 10(A)–(C) are diagrams showing the size of the projector of this embodiment as a whole in comparison with the size of a conventional projector as a whole.

DETAILED DESCRIPTION OF PREFERRED EMBODIMENTS

An embodiment of the present invention will be illustrated with reference to the drawings. In the following embodiment, three axes orthogonal to each other will be referred to as x-, y-, and z-axes, unless otherwise defined. The direction in which light propagates (the direction parallel to the optical axis) is the z-axis-direction. The horizontal and vertical directions are the x-axis direction and the y-axis direction, respectively.

Figure 1:
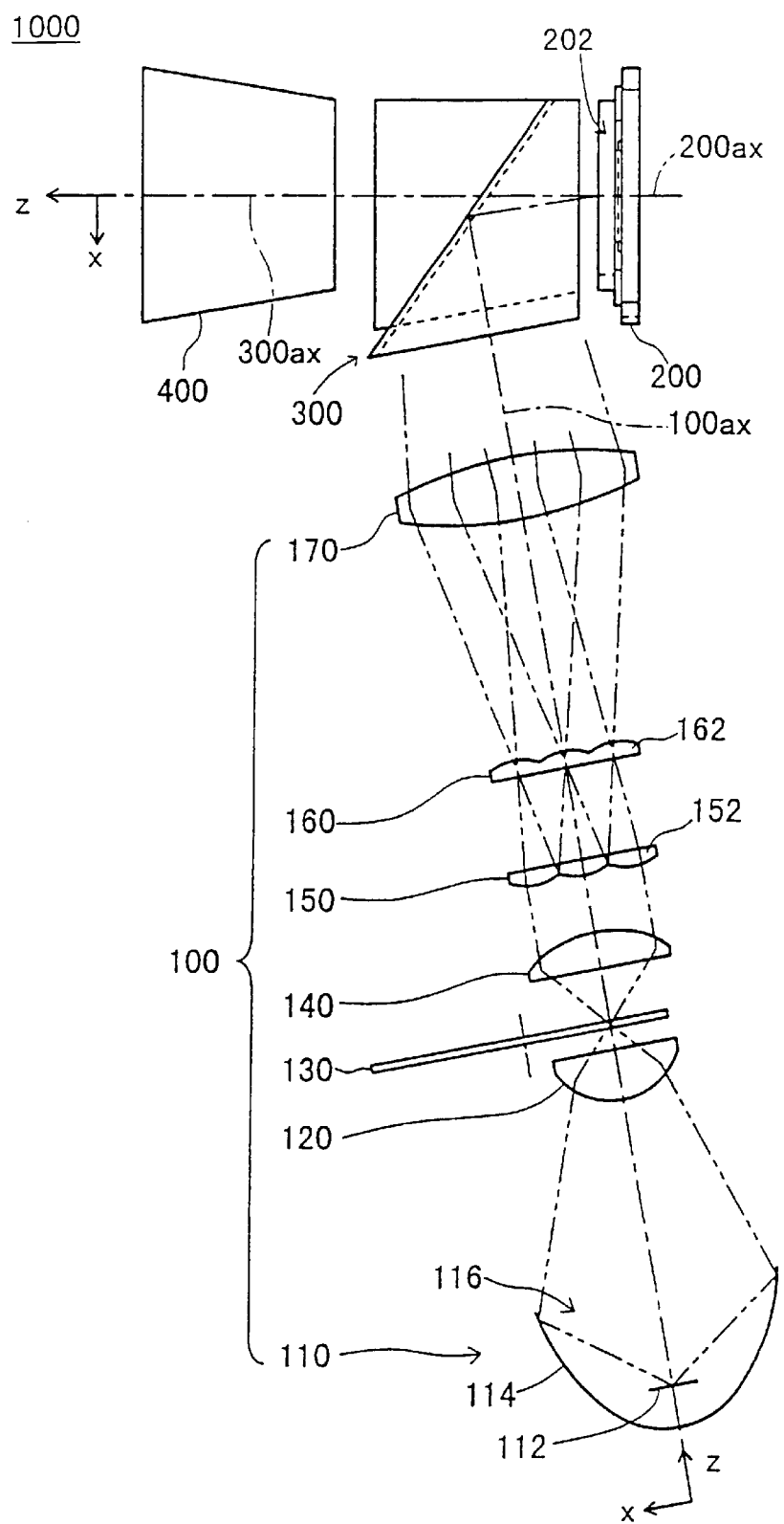
FIG. 1 is a schematic plan view of a main part of a projector according to an embodiment of the present invention.

FIG. 1 is a schematic plan view of the main part of a projector according to an embodiment of the present invention. This projector 1000 may consist of an illumination optical system 100, a micro-mirror type optical modulator 200, a prism 300, and a projection lens (projection optical system) 400. The micro-mirror type optical modulator 200 and the projection lens 400 are arranged such that their central axes 200ax and 300ax coincide with each other. As described below, due to the restriction to the incident angle of the light illuminating the micro-mirror type optical modulator 200, the illumination optical system 100 is arranged such that the central axis 100ax of the illumination optical system 100 is inclined at a predetermined angle with respect to the central axis 200ax of the micro-mirror type optical modulator 200 (the normal of the light illumination surface 202). Here, the term "light illumination surface" means the area in which the applied light can be utilized as light for forming an image. That is, the light illumination surface in a narrow sense is the area in which the micro-mirror described below is formed. However, in the following, the entire area illuminated with light, including the portion outside the area where the micro-mirror is formed, is sometimes referred to as the light illumination surface.

The light illumination optical system 100 may consist of a light source portion 110, a first condenser lens 120, a color wheel 130, a second condenser lens 140, a first lens array 150, a second lens array 160, and a superimposing lens 170. These optical elements 100, 120, 130, 140, 150, 160, and 170 are arranged in that order along the central axis 100ax of the illumination optical system 100.

The light source portion 110 has a light source lamp 112 and a concave mirror 114. The light source lamp 112 is a radiation light source that emits radiant light. The light source lamp 112 consists of a high-pressure discharge lamp such as a metal halide lamp or a high-pressure mercury lamp. The concave mirror 114 is an ellipsoidal concave mirror emitting condensed light from an opening 116 such that the radiant light from the light source lamp 112 is reflected and impinges upon the first condenser lens 120. The concave mirror 114 may be a parabolic mirror which reflects the radiant light from the light source lamp 112 and emits the reflected light as substantially parallel rays. In this case, to cause the substantially parallel rays to impinge upon the first condenser lens 120, another condenser lens may be provided between the light source portion 110 and the first condenser lens 120.

The first condenser lens 120 is an optical element for condensing the light from the light source portion 110 on the color wheel 130 in order to reduce the size of the light spot applied to the color wheel 130.

Figure 2:
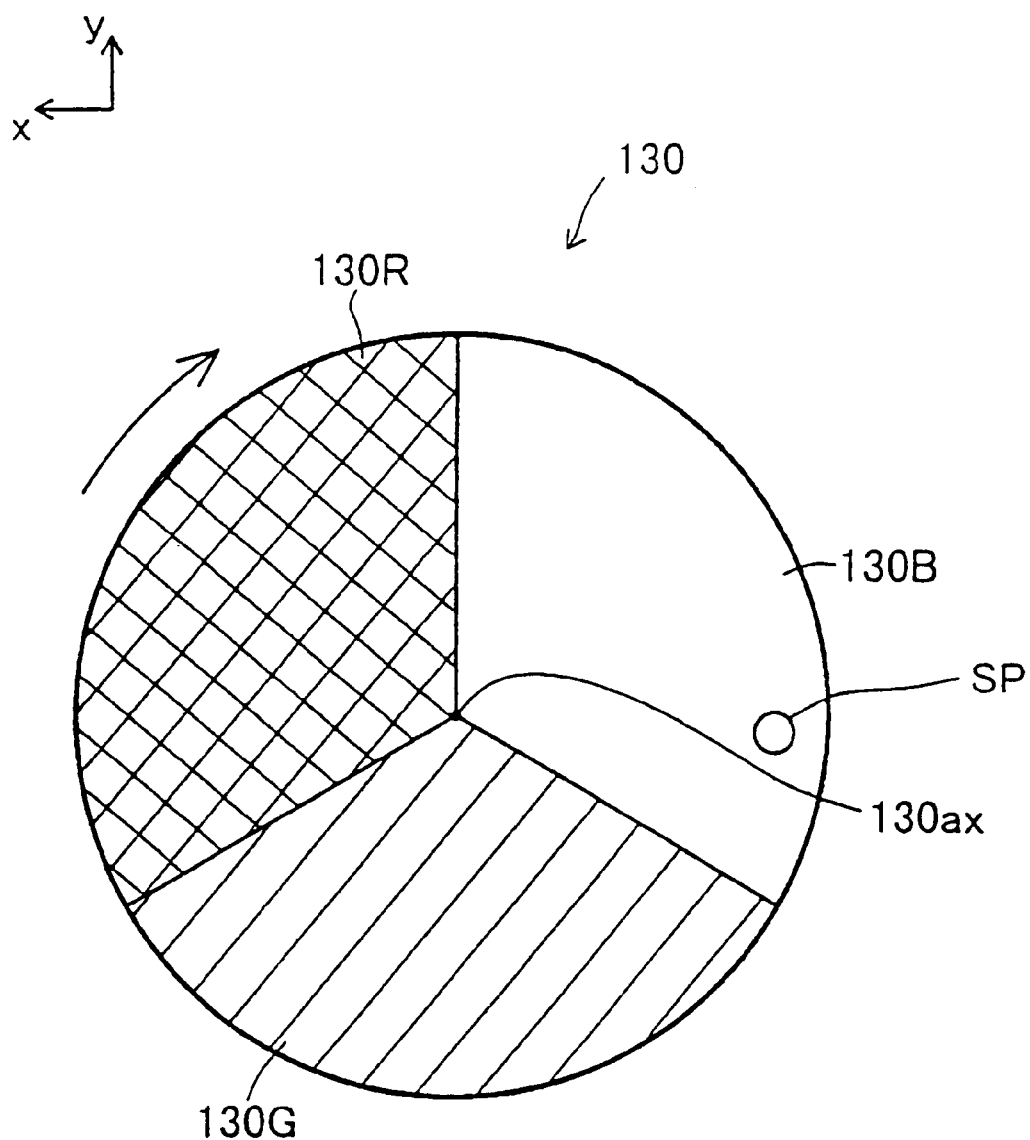
FIG. 2 is a front view of the color wheel 130 as seen from the light source portion 110 side.

FIG. 2 is a front view of the color wheel 130 as seen from the light source portion 110 side. The color wheel 130 is divided into three fan-shaped sections along the rotational direction, where three transmission type color filters 130R, 130G and 130B are formed. The first color filter 130R allows light in the red wavelength range (hereinafter referred to as "red light R") to be transmitted therethrough, and reflects or absorbs light in the other wavelength ranges. Similarly, the second and third color filters 130G and 130B allow light in the green and blue wavelength ranges (hereinafter referred to as "green light G" and "blue light B"), respectively, to be transmitted therethrough, and to reflect or absorb light in the other wavelength ranges. The color filters are formed, for example, by dielectric multilayers or filter plates formed using color dyes.

The color wheel 130 is arranged such that the light spot SP condensed by the first condenser lens 120 is applied to a predetermined peripheral position deviated from the central axis 130ax of the color wheel 130. Further, the color wheel 130 is rotated around the central axis 130ax (rotation axis) by a motor (not shown) at a constant speed. At this time, the light spot SP is applied to the color filter ranges 130R, 130G and 130B at fixed intervals in turn as the color wheel 130 rotates. As a result, the light transmitted through the color wheel 130 changes in turn as red light R, green light G, and blue light B as the color wheel 130 rotates.

The second condenser lens 140 in FIG. 1 condenses the light transmitted through the color wheel 130 such that the light impinges upon the first lens array 150. In this embodiment, the second condenser lens 140 is set such that the diverging rays transmitted through the color wheel 130 become substantially parallel light.

The first lens array 150 is a lens array formed by a plurality of small lenses 152 having a quadrilateral contour. This first lens array 150 divides the substantially parallel rays emitted from the second condenser lens 140 into a plurality of partial pencils of light corresponding to the plurality of small lenses 152, and causes partial pencils of light to be condensed in the vicinity of the second lens array 160.

The second lens array 160 is equipped with small lenses 162 corresponding to each of the small lenses 152 of the first lens array 150. The second lens array 160 causes the respective central axes of the partial pencils of light emitted from the first lens array 150 to be substantially parallel to the central axis 100ax. The small lenses 162 of the second lens array 160 may have a configuration other than quadrilateral as long as the corresponding partial pencils of light emitted from the first lens array 150 can impinge thereon. In this embodiment, a lens array in which only the orientation of the lens surfaces (convex surfaces) are different from that of the lens surfaces of the first lens array 150 is used.

The superimposing lens 170 superimposes the plurality of partial pencils of light emitted from the second lens array 160 on the light illumination surface 202 of the micro-mirror type optical modulator 200.

The two lens arrays 150 and 160 and the superimposing lens 170 form a so-called integrator optical system, whereby the illumination optical system 100 uniformly illuminates the light illumination surface 202 of the micro-mirror type optical modulator 200.

Figure 3A:
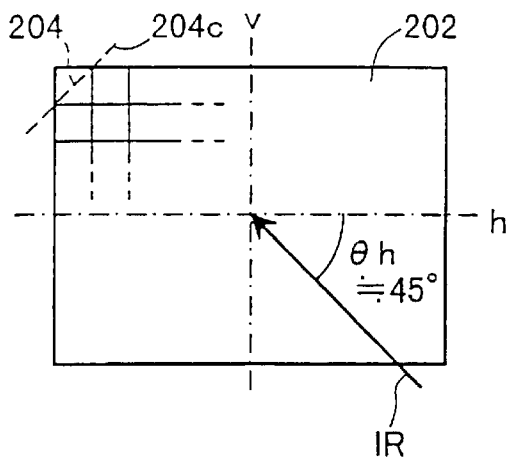
FIGS. 3(A)–(C) are diagrams illustrating a DMD, which is an example of the micro-mirror type optical modulator 200.

The micro-mirror type optical modulator 200 is an optical modulator which modulates the illumination light applied to the light illumination surface by reflecting the illumination light using the micro-mirrors according to image information, and emits the light toward the projection lens 400. FIG. 3 illustrates a DMD which is an example of the micro-mirror type optical modulator 200. As shown in FIG. 3(A), a plurality of micro-mirrors 204 having a substantially square contour are formed in a matrix on the light illumination surface 202 of the DMD 200. Each micro-mirror 204 is formed so as to be rotatable within a predetermined angular range by using the diagonal line connecting the lower left and the upper right corners as a rotation axis 204c. These micro-mirrors 204 correspond to the pixels forming an image.

Figure 3B:
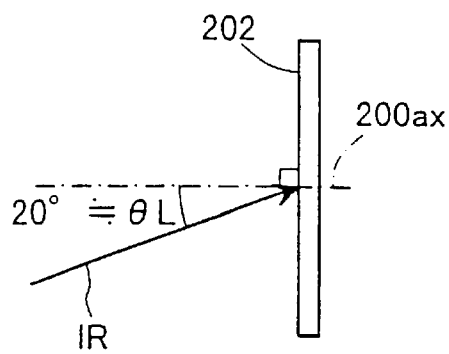

In an exemplary embodiment, the horizontal axis of the light illumination surface 202 is h, and the vertical axis thereof is v. Further, to make the description easy to understand, the illumination light applied to the light illumination surface 202 will be represented by the central rays (incident rays) IR. To simplify the construction of the apparatus, it is desirable that the illumination light IR applied to the DMD 200 has an incident surface perpendicular to the rotation axis 204c of each micro-mirror 204. Here, the rotation axis 204c is a diagonal line connecting the lower left corner and the upper right corner of the micro-mirror 204, so that the line is inclined obliquely upward to the right by approximately 45 degrees with respect to the horizontal axis h. Thus, as shown in FIG. 3(A), the illumination light IR applied to the DMD 200 is incident from obliquely below such that the inclination θh of the illumination light IR projected onto the light illumination surface 202 with respect to the horizontal axis h is approximately 45 degrees. Further, as shown in FIG. 3(B), the illumination light IR is incident onto the illumination surface 202 such that the inclination θL of the illumination light IR with respect to the normal 200ax of the light illumination surface 202 is approximately 20 degrees.

Figure 3C:
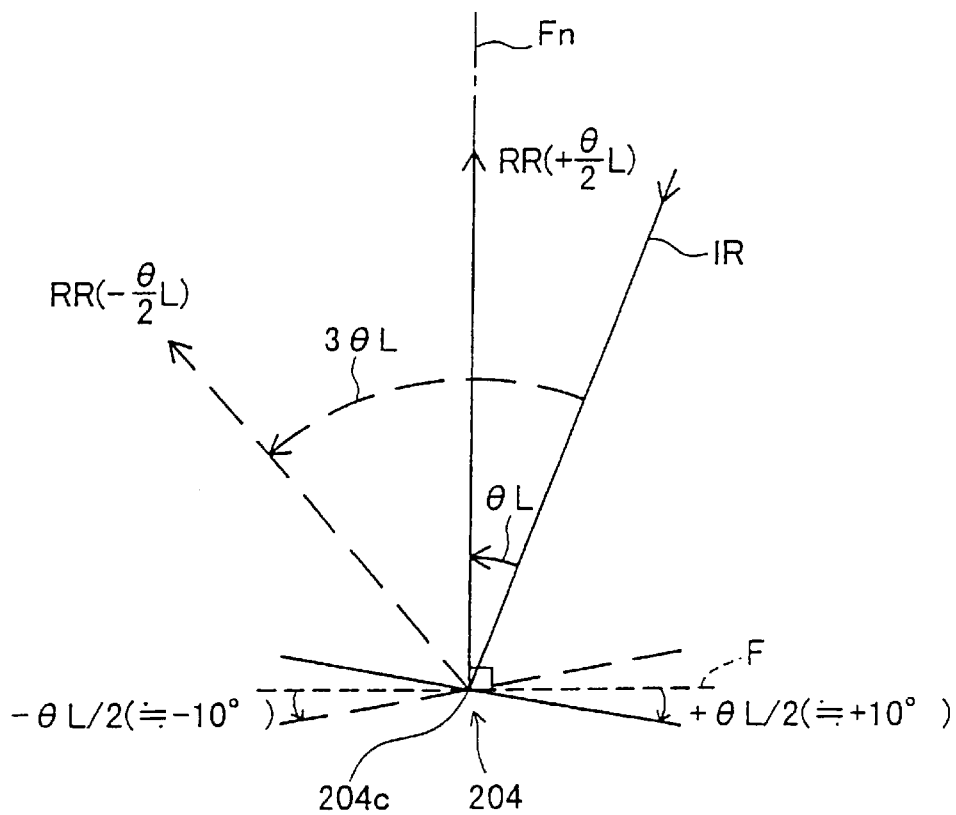

FIG. 3(C) shows an optical path onto the incident surface, including the incident light and reflected light on and from the micro-mirror 204, that is, in a section perpendicular to the rotation axis 204c. The micro-mirror 204 rotates approximately +(θL/2) degrees (which is nearly equal to ±10 degrees) around the rotation axis 204c with respect to a plane F (indicated by the broken line in FIG. 3(C)) parallel to the light illumination surface 202. An angle as measured clockwise is a positive angle. As described above, the illumination light IR impinges upon the micro-mirror 204 from a direction inclined by +θL (which is nearly equal to +20 degrees from the normal Fn of the plane F).

In the case in which the micro-mirror 204 is inclined +(θL/2) with respect to the plane F, the illumination light IR is emitted in a direction inclined by −θL from the illumination light IR, that is, in a direction parallel to the normal Fn, as reflected light RR (+θL/2). When the micro-mirror 204 is inclined by −(θL/2), the illumination light IR is emitted in a direction inclined −(3·θL) from the illumination light IR as reflected light RR (−θL/2). In this way, the illumination light IR applied to the micro mirror 204 is reflected in variety directions depending on the rotation angle of the micro-mirror 204. For example, when the projection lens is arranged in the direction of the reflected light RR (+θL/2), only the reflected light RR (+θL/2) is utilized as the light for forming an image. Due to this arrangement, in the condition in which the micro-mirror 204 is inclined +(θL/2), the reflected light is projected through the projection lens to realize a bright display, and in the condition in which the micro-mirror 204 is inclined −(θL/2), the reflected light is not projected through the projection lens to realize a dark display. An intermediate gray-scale is realized by a method in which the display proportion of bright and dark is controlled according to the gray-scale in a fixed period of time in which one pixel draws an image (a so-called pulse width modulation method).

The prism 300 in FIG. 1 reflects illumination light emitted from the illumination optical system 100 and impinging thereon to cause the light to impinge upon the light illumination surface 202 of the DMD 200 at a predetermined angle. Further, the prism 300 allows modulated light emitted from the DMD 200 to be transmitted therethrough and emits the light toward the projection lens 400. Usually, the prism 300 is set such that the incident light from the illumination optical system 100 undergoes total reflection. As described above, the projection lens 400 is arranged such that the reflected light in the condition in which the micro-mirror 204 is inclined +($\theta$L/2) is utilized as light for forming an image. Due to this arrangement, the modulated light emitted from the micro-mirror type optical modulator 200 according to the image information is projected through the projection lens 400 to display an image. The construction of the prism 300 will be described in detail below.

As described above, from the illumination optical system 100, red light R, green light G and blue light B are emitted at fixed intervals in turn as the color wheel 130 rotates. At this time, each micro-mirror 204 of the micro-mirror type optical modulator 200 is controlled in accordance with image information according to the color light applied, whereby it is possible to display a color image. Further, it is possible to omit the color wheel 130 to display a monochrome image. In this case, the two condenser lenses 120 and 140 may also be omitted. Further, instead of a parabolic concave mirror, the concave mirror 114 of the light source portion 110 may be employed to emit substantially parallel rays.

Figure 4E:
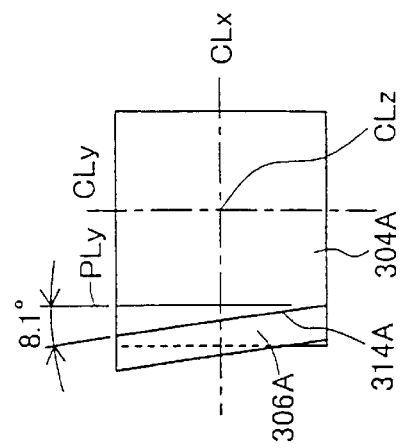
FIGS. 4(A)–(E) are diagrams illustrating the construction of the prism 300.
Figure 4A:
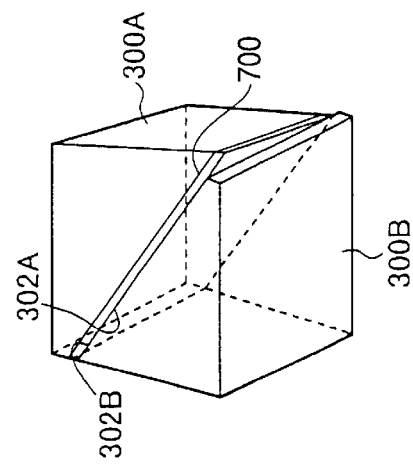
Figure 4D:
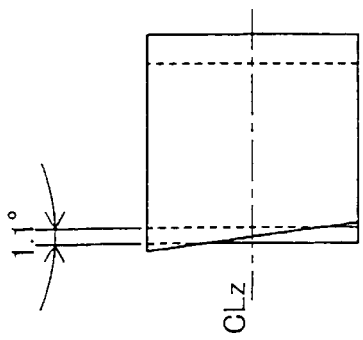

The projector 1000 of the present invention is characterized in the construction of the prism 300. FIGS. 4(A)–(E) are schematic diagrams illustrating the construction of the prism 300. FIG. 4(A) is a perspective view of the prism 300. The prism 300 is equipped with two prism columns 300A and 300B.

Figure 5E:
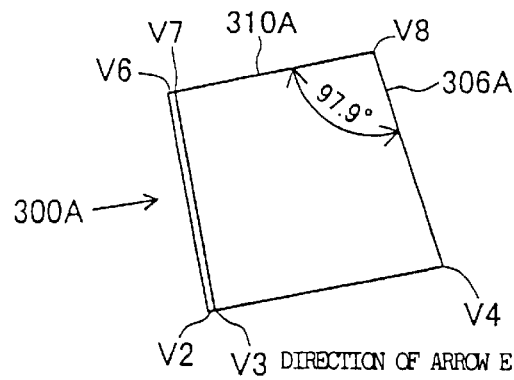
FIGS. 5(A)–(F) are diagrams illustrating the construction of the first prism column 300A.
Figure 5F:
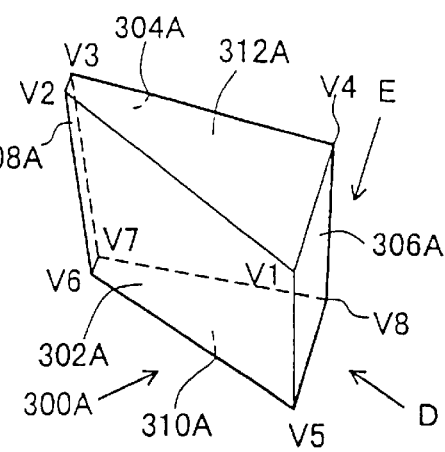
Figure 5A:
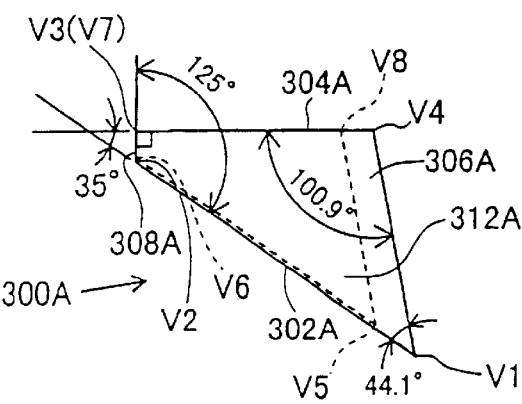
Figure 5D:
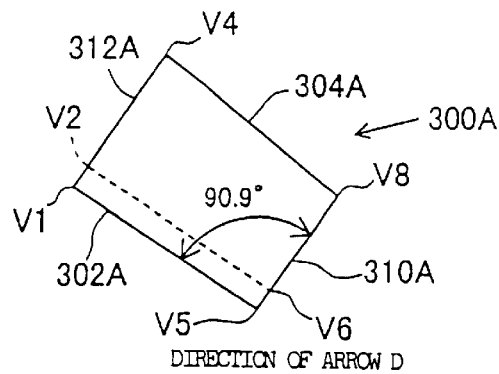

FIGS. 5(A)–(F) are schematic diagrams illustrating the construction of the first prism column 300A. FIGS. 5(A), 5(B), 5(C), and 5(F) are a plan view, a front view, a right-hand side view, and a perspective view, respectively. FIGS. 5(D) and 5(E) are views seen from the directions of the arrows D and E of FIG. 5(F), respectively. The positions of the corners of the first prism column 300A are indicated by numerals V1 through V8. As shown in FIG. 5(F), which is a perspective view, the first prism column 300A is a columnar hexahedron having face V5V6V7V8 (bottom surface 310A), face V1V2V3V4 (top surface 312A), face V1V5V6V2 (side surface 302A), face V8V7V3V4 (side surface 304A), face V4V8V5V1 (side surface 306A), and face V2V6V7V3 (side surface 308A). The direction D is a direction parallel to the edge V5V6 connecting the two corners V5 and V6, and the direction E is a direction parallel to the edge V8V5 connecting the two corners V8 and V5.

Figure 5B:
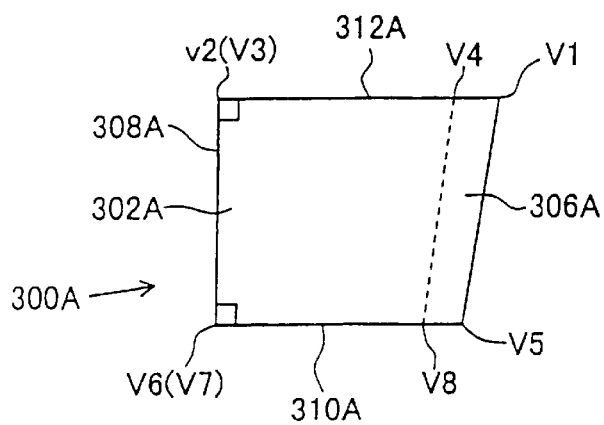
Figure 5C:
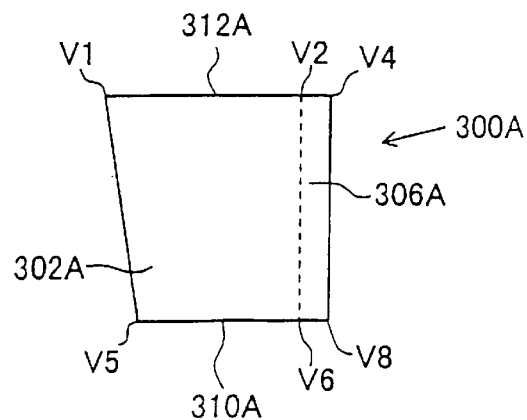

In FIG. 5(A), which is a plan view, in the prism column 300A, the angle made by the edge V1V2 connecting the two corners V1 and V2 and the edge V4V3 connecting the two corners V4 and V3 is approximately 35 degrees, the angle made by the edge V1V2 and the edge V3V2 connecting the corners V3 and V2 is approximately 125 degrees, and the angle made by the edge V1V4 connecting the two corners V1 and V4 and the edge V3V4 connecting the corners V3 and V4 is approximately 100.9 degrees. In FIG. 5(B), which is a front view, the side surface. 308A is perpendicular to the bottom surface 310A and the top surface 312A. Further, in FIG. 5(D), which is a view as seen from the direction of the arrow D, the angle made by the side surface 302A and the bottom surface 310A is approximately 90.9 degrees, and, in FIG. 5(E), which is a view as seen from the direction of the arrow E, the angle made by the side surface 306A and the bottom surface 310A is approximately 97.9 degrees.

FIGS. 6(A)–(C) are diagrams illustrating how the first prism column 300A is prepared. FIG. 6(A) is a plan view showing a right-angle prism 300AO for preparing the first prism column 300A, and FIGS. 6(B) and 6(C) are views as seen from the directions of the arrows B and C in FIG. 6(A), respectively. The direction B is a direction parallel to the intersection line SL2D of the bottom surface 310AO and the cross section SL2, and the direction C is a direction parallel to the intersection line SL1D of the bottom surface 310AO and the cross section SL1. The right-angle prism 300AO is a triangular prism in which the configuration of the bottom surface 310AO and the top surface 312AO is a right triangle and in which the configuration of the three side surfaces 302AO, 304AO and 306AO is rectangular. The prism column 300A is prepared by cutting the right-angle prism 300AO along three cross sections SL1, SL2 and SL3. The top surface 312AO and the bottom surface 310AO of the right-angle prism 300AO correspond to the top surface 312A and the bottom surface 310A of the prism column 300A shown in FIG. 5(A), respectively.

As shown in FIG. 6(A), the intersection line SL1U of the cross section SL1 and the top surface 312AO of the right-angle prism 300AO is inclined approximately 35 degrees with respect to the side surface 304AO. Further, as shown in FIG. 6(C), the cross section SL1 is inclined approximately 90.9 degrees with respect to the bottom surface 310AO. By cutting the right-angle prism 300AO along this cross section SL1, it is possible to form the side surface 302A which is inclined approximately 90.9 degrees with respect to the bottom surface 310A of the first prism column 300A as shown in FIG. 5(D), which is a view as seen from the direction of the arrow D.

As shown in FIG. 6(A), the intersection line SL2U of the cross section SL2 and the top surface 312AO of the right-angle prism 300AO is inclined approximately 100.9 degrees with respect to the side surface 304AO. Further, as shown in FIG. 6(B), the cross section SL2 is inclined approximately 97.9 degrees with respect to the bottom surface 310AO. By cutting the right-angle prism 300AO along this cross section SL2, it is possible to form the side surface 306A which is inclined approximately 97.9 degrees with respect to the bottom surface 310A of the prism column 300A as shown in FIG. 5(E), which is a view as seen from the direction of the arrow E.

As shown in FIG. 6(A), the cross section SL3 is perpendicular to the side surface 304AO. By cutting the right-angle prism 300AO along this cross section SL3, it is possible to form the side surface 308A such that, as shown in FIG. 5(A), the angle made by the edge V1V2 connecting the corners V1 and V2 and the edge V3V2 connecting the corners V2 and V3 is 125 degrees.

FIGS. 7(A)–(E) are diagrams illustrating the construction of the second prism column 300B. FIGS. 7(A), 7(B), 7(C), and 7(E) are a plan view, a front view, a right-hand side view, and a perspective view, respectively. FIG. 7(D) is a view as seen from the direction of the arrow D in FIG. 7(E). The positions of the corners of the second prism column 300B are indicated by numerals P1 through P8. As shown in FIG. 7(E), which is a perspective view, the second prism column 300B is a columnar hexahedron having a face P5P6P7P8

(bottom surface 310B), a face P1P2P3P4 (top surface 312B), a face P4P8P7P3 (side surface 302B), a face P1P5P6P2 (side surface 304B), a face P2P6P7P3 (side surface 306B), and a face P4P8P5P1 (side surface 308B). The direction D is a direction parallel to the edge P8P7 connecting the two corners P8 and P7.

In FIG. 7(A), which is a plan view, the prism column 300B is formed such that the angle made by the edge P2P1 connecting the two corners P2 and P1 and the edge P3P4 connecting the two corners P3 and P4 is approximately 35 degrees, that the angle made by the edge P1P2 connecting the two corners P1 and P2 and the edge P3P2 connecting the two corners P3 and P2 is approximately 90 degrees, and that the edge P2P3 connecting the two corners P2 and P3 and the edge P4P3 connecting the two corners P4 and P3 is approximately 55 degrees. Further, in FIG. 7(B), which is a front view, the side surfaces 306B and 308B are perpendicular to the bottom surface 310B and the top surface 312B. Further, in FIG. 7(D), which is a view as seen from the direction of the arrow D, the angle made by the side surface 302B (face P4P8P7P3) and the bottom surface 31DB (face P5P6P7P8) is approximately 89.1 degrees. Further, in FIG. 7(C), which is a right-hand side view, the angle made by the edge P5P1 connecting the two corners P5 and P1 and the edge P8P4 connecting the two corners P8 and P4 is approximately 1.1 degrees.

FIGS. 8(A)–(B) are diagrams illustrating how the second prism column 300B is prepared. FIG. 8(A) is a plan view showing a right-angle prism 300BO for preparing the second prism column 300B, and FIG. 8(B) is a view as seen from the direction of the arrow B of FIG. 8(A). The direction B is a direction parallel to the intersection line SL4D of the bottom surface 310BO and the cross section SL4. Usually, a prism having the same configuration and characteristics as the right-angle prism 300AO is used as the right-angle prism 300BO. The prism column 300B is prepared by cutting the right-angle prism 300BO along the two cross sections SL4 and SL5. The top surface 312BO, the bottom surface 310BO, the side surface 304BO, and the side surface 306BO of the right-angle prism 300BO correspond to the top surface 312B, the bottom surface 310B, the side surface 304B, and the side surface 306B of the prism column 300B shown in FIG. 7(A), respectively.

As shown in FIG. 8(A), the intersection line SL4U of the cross section SL4 and the top surface 312BO of the right-angle prism 300BO is inclined approximately 35 degrees with respect to the side surface 304BO. Further, as shown in FIG. 8(B), the cross section SL4 is inclined approximately 89.1 degrees with respect to the bottom surface 310BO. By cutting the right-angle prism 300BO along this cross section SL4, it is possible to form a side surface 302B which is inclined approximately 89.1 degrees with respect to the bottom surface 310B of the prism column 300B as shown in FIG. 7(D).

As shown in FIG. 8(A), the cross section SL5 is a plane perpendicular to the top surface 312BO, the bottom surface 310BO, and the side surface 304BO. By cutting the right-angle prism 300BO along this cross section SL5, it is possible to form a side surface 308B which is perpendicular to the top surface 312B, the bottom surface 310B, and the side surface 304B as shown in FIG. 7(B). Further, as shown in FIG. 8(B), the cross section SL4 is inclined approximately 89.1 degrees with respect to the bottom surface 310BO. Thus, by cutting the right-angle prism 300BO along these cross sections SL4 and SL5, it is possible to form the side surface 308B such that the angle made by the edge P5P1 connecting the two corners P5 and P1 and the edge P8P4 connecting the two corners P8 and P4 is approximately 1.1 degrees as shown in FIG. 7(C).

As shown in FIG. 4(A), which is a perspective view, in the prism 300, the side surface 302A of the first prism column 300A and the side surface 302B of the second prism column 300B are joined together through the intermediation of a spacer (not shown). Thus, between the side surface 302A of the prism column 300A and the side surface 302B of the prism column 300B, there is a gap formed equivalent to the height of the spacer. Usually, this gap is approximately 0.01 mm. The refractive index n of the two prism columns 300A and 300B is approximately 1.56883. Due to this arrangement, the side surface 302A functions as a selective reflection/transmission surface whose reflection and transmission characteristics vary in accordance with the incident angle of light. The refractive index n of the two prism columns 300A and 300B and the size of the gap between the two side surfaces 302A and 302B are not restricted to the above, and can be adjusted in accordance with the specifications required.

Figure 4B:
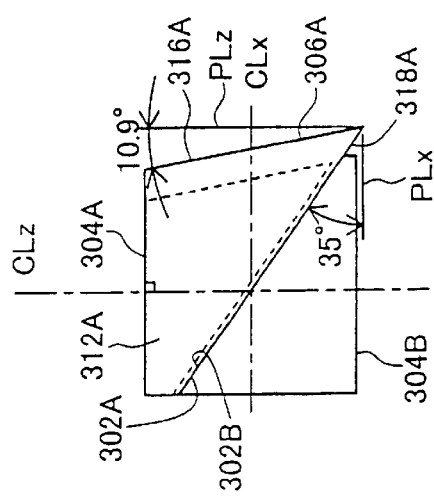
Figure 4C:
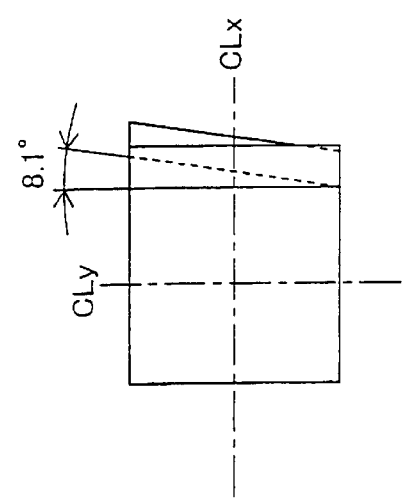

As shown in FIG. 4(B), which is a plan view, the intersection line 316A of the side surface 306A and the top surface 312A of the prism 300 formed by the two prism columns 300A and 300B is inclined approximately 10.9 degrees with respect to the leader line PLz parallel to the central axis CLz perpendicular to the side surface 304A. The intersection line 318A of the side surface 302A and the top surface 312A is inclined approximately 35 degrees with respect to the leader line PLx parallel to the central axis CLx parallel to the side surface 304A. Further, as shown in FIG. 4(E), which is a rear view, the intersection line 314A of the side surfaces 304A and 306A is inclined approximately 8.1 degrees with respect to the leader line PLy parallel to the central axis CLy perpendicular to the central axes CLz and CLx.

FIGS. 9(A)–(D) are diagrams illustrating the illumination light impinging upon the DMD 200 through the prism 300. FIGS. 9(A), 9(B), 9(C) and 9(D) are a front view, a plan view, a right-hand side view, and a perspective view, respectively. The prism 300 is arranged such that the side surface 304A of the prism 300 is in close proximity and substantially parallel to the light illumination surface 202 of the DMD 200. The central axis CLz of the prism 300 is arranged so as to coincide with the central axis 200ax perpendicular to the light illumination surface 202 of the DMD 200. The axis parallel to this central axis is the z-axis, and the direction from the DMD 200 to the prism 300 is the normal direction. Of the axes which are perpendicular to the z-axis and which are orthogonal to each other, the horizontal axis is the x-axis, and the vertical axis is the y-axis. The central axes CLx and CLy of the prism 300 are arranged so as to be parallel to the x-axis and the y-axis, respectively. In the following description, for the sake of clarity, the illumination light impinging upon the center of the light illumination surface 202 will be described. That is, in the following description, each illumination light is represented by the central beam (central axis) thereof.

Figure 9B:
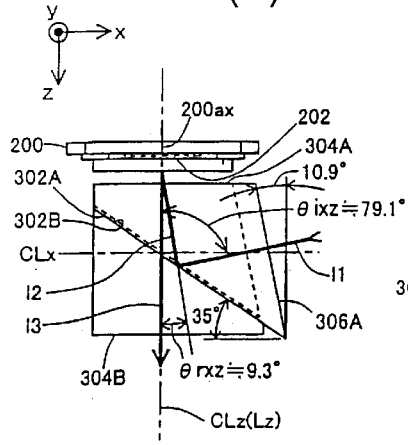
FIGS. 9(A)–(D) are diagrams illustrating the illumination light impinging upon the DMD 200 through the prism 300.

As shown in FIG. 9(B), the illumination light I1 emitted from the illumination optical system 100 (not shown) impinges upon the side surface 306A of the prism 300 perpendicularly. The illumination light I1 incident on the prism 300 undergoes total reflection at the selective reflection/transmission surface 302A of the prism 300. The illumination light I2 reflected by the selective reflection/transmission surface 302A is emitted from the side surface 304A, and is applied to the light illumination surface 202 of the DMD 200. The DMD 200 reflects the illumination light I2 applied to the light illumination surface 202 according to the image information. Of the illumination light reflected at the DMD 200, the modulated light reflected in the z-direction is utilized as the light representing an image. The modulated light I3 emitted from the DMD 200 impinges upon the side surface 304A of the prism 300 perpendicularly, and is transmitted through the selective reflection/transmission surface 302A and also is transmitted through the side surface 302B, to be emitted from the side surface 304B toward the projection lens 400 (not shown).

Figure 9D:
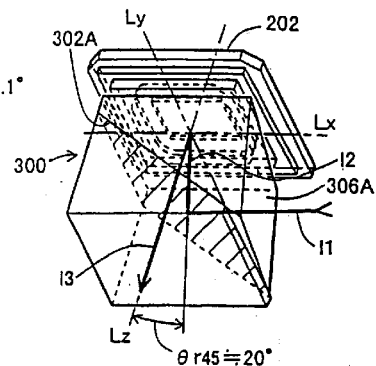
Figure 9A:
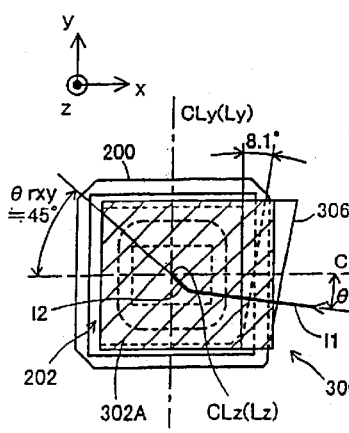

To satisfy the restriction as described with reference to FIGS. 3(A)–(C), the optical path of the illumination light I2 applied to the light illumination surface is set such that, as shown in FIG. 9(A), when projected onto the xy-plane parallel to the light illumination surface 202, the light is directed obliquely downward to the right at approximately 45 degrees with respect to the central axis Lx parallel to the x-axis (the central axis parallel to the central axis CLx of the prism 300). Further, as shown in FIG. 9(D), on the incident surface including the optical path of the illumination light I2 and the optical path of the modulated light I3, the incident angle of the illumination light I2 is approximately 20 degrees.

On the other hand, the optical path of the illumination light I1 impinging upon the side surface 306A is, as shown in FIG. 9(A), inclined obliquely downward to the right at approximately 8.1 degrees with respect to the central axis Lx when projected onto the xy-plane parallel to the light illumination surface 202. Thus, it is possible to make the inclination of the illumination light I1 projected onto the xy-plane with respect to the central axis Lx smaller than the inclination of the illumination light I2 projected onto the xy-plane.

FIGS. 10(A)–(C) are diagrams illustrating the size of the projector of this embodiment as a whole in comparison to the size of the conventional projector as a whole. As shown in FIG. 10(A), in the conventional projector, the illumination optical system 100 is arranged such that, when the optical path of the illumination light I1 emitted from the illumination optical system 100 is projected onto the xy-plane parallel to the substantially rectangular light illumination surface 502 of the DMD 500, the optical path of the illumination light I1 is directed obliquely downward to the right at approximately 45 degrees with respect to the x-axis. On the other hand, as shown in FIG. 10(B), in the projector 1000 of this embodiment, the illumination optical system 100 is arranged such that when the optical path of the illumination light I1 emitted from the illumination optical system 100 is projected onto the xy-plane parallel to the substantially rectangular light illumination surface 202 of the DMD 200, the optical path of the illumination light I1 is directed obliquely downward to the right at approximately 8.1 degrees with respect to the x-axis. Thus, in the projector 1000 of this embodiment, the requisite space for arranging the illumination optical system 100 can be reduced in the vertical direction as compared with the conventional apparatus, whereby the size of the projector can be reduced as compared with the conventional apparatus.

Further, while in the above-described embodiment, setting is made such that when the optical path of the illumination light I1 impinging upon the prism 300 is projected onto the xy-plane parallel to the light illumination surface 202 of the DMD 200, the optical path of the illumination light I1 is directed obliquely downward to the right at approximately 8.1 degrees with respect to the x-axis, this should not be construed restrictively. It is also possible, for example, to construct the prism such that the optical path of the illumination light I1 is inclined downward to the right at more than 45 degrees with respect to the x-axis. In this case, as shown in FIG. 10(C), the requisite space for arranging the illumination optical system can be reduced in the horizontal direction as compared to the conventional example. In this case also, the size of the projector can be reduced as compared with that of the conventional apparatus.

While the DMD used as the micro-mirror type optical modulator 200 in the above-described example is set such that the optical path of the illumination light I2 projected onto the xy-plane parallel to the light illumination surface 202 is directed obliquely downward at approximately 45 degrees, and that the incident angle of the illumination light I2 is approximately 20 degrees in the incident plane including the optical path of the illumination light I2 and the optical path of the modulated light I3, this should not be construed restrictively. For example, it is also possible to adopt a micro-mirror type optical modulator in which setting is made such that the optical path of the illumination light I2 is inclined obliquely downward to the right at an angle larger or smaller than approximately 45 degrees with respect to the x-axis. Further, it is also possible to adopt an optical modulator in which, in the incident plane including the optical path of the illumination light I2 and the optical path of the modulated light I3, the incident angle of the illumination light I2 is smaller or larger than approximately 20 degrees. In this case, the selective reflection/transmission surface of the prism is formed such that when the optical path of the illumination light is projected onto a predetermined plane parallel to the light illumination surface of the micro-mirror type optical modulator, the inclination of the central axis of the illumination light emitted from the illumination optical system and impinging upon the selective reflection/transmission surface is different from the inclination of the central axis of the illumination light reflected by the selective reflection/transmission surface and impinging upon the light illumination surface.

Further, while in the above-described projector, an illumination optical system equipped with an integrator optical system having an lens array and a superimposing lens is used, this should not be construed restrictively. It is also possible, for example, to use an illumination optical system equipped with an integrator optical system using a prism called an integrator rod. Further, it is also possible to use an illumination optical system using no integrator optical system. That is, any type of illumination optical system will do as long as it is capable of illuminating the light illumination surface of the micro-mirror type optical modulator.

While the above-described embodiment is a projector using a micro-mirror type optical modulator, this should not be construed restrictively. By controlling the emitting direction of the illumination light applied to the light illumination surface in accordance with image information, it can use various types of optical modulator for modulating light.

The present invention is not restricted to the embodiments described above; various modifications are possible without departing from the gist of the present invention.

What is claimed is:

1. A projector that projects images and displays the images, comprising:
   an illumination optical system that emits illumination light;
   an optical modulator having a light illumination surface that controls an emitting direction of light applied to the light illumination surface in accordance with image information, to modulate the light applied to the illumination surface;

a projection optical system that projects light emitted from the optical modulator; and a prism provided between the optical modulator and the projection optical system, the prism having a selective reflection/transmission surface that reflects the illumination light emitted from the illumination optical system to cause the illumination light to impinge upon the light illumination surface at a predetermined angle, and that transmits the light emitted from the optical modulator to the projection optical system, the selective reflection/transmission surface being formed such that, when optical paths of the illumination light are projected onto a plane parallel to the light illumination surface, an inclination of a central axis of the illumination light emitted from the illumination optical system and impinging upon the selective reflection/transmission surface is different from an inclination of an central axis of the illumination light reflected by the selective reflection/transmission surface and impinging upon the light illumination surface.

2. The projector according to claim 1, the light illumination surface having a substantially rectangular contour.

3. The projector according to claim 2, when an optical path of the illumination light is projected onto a plane parallel to the light illumination surface, the central axis of the illumination light reflected by the selective reflection/transmission surface and impinging upon the light illumination surface being inclined approximately 45 degrees with respect to a side of the contour of the light illumination surface.

4. The projector according to claim 1, the optical modulator comprising a plurality of micro-mirrors.

5. The projector according to claim 1, the prism comprising a first prism column and a second prism column.

6. The projector according to claim 5, the first prism column and the second prism column being joined with a spacer therebetween.

7. A prism that reflects incident light from a first direction as reflected light in a second direction, and that transmits incident light from a third direction as transmitted light, the prism comprising:

a light selective reflection/transmission surface that reflects the incident light from the first direction such that, when optical paths of the incident light from the first direction and the reflected light are projected onto a panel parallel to the light illumination surface, an inclination of a central axis of the incident light from the first direction is different from an inclination of a central axis of the reflected light.

8. A method for projecting images and displaying the images, comprising:

emitting illumination light;

reflecting the emitted illumination light to cause the illumination light to impinge upon an light illumination surface of an optical modulator at a predetermined angle;

controlling an emitting direction of the light impinged upon the light illumination surface in accordance with image information, to modulate the light impinged on the illumination surface;

transmitting the light emitted from the optical modulator to a projection optical system; and projecting the light emitted from the optical modulator, such that, when optical paths of the illumination light are projected onto a plane parallel to the light illumination surface, an inclination of a central axis of the illumination light emitted from the illumination optical system is different from an inclination of an central axis of the reflected light impinging upon the light illumination surface.

9. The method according to claim 8, the light illumination surface having a substantially rectangular contour.

10. The method according to claim 9, when an optical path of the illumination light is projected onto a plane parallel to the light illumination surface, the central axis of the reflected illumination light impinging upon the light illumination surface being inclined approximately 45 degrees with respect to a side of the contour of the light illumination surface.

11. A method for projecting images and displaying the images, comprising:

reflecting incident light from a first direction as reflected light in a second direction;

transmitting incident light from a third direction as transmitted light, such that, when optical paths of the incident light from the first direction and the reflected light are projected onto a panel parallel to the light illumination surface, an inclination of a central axis of the incident light from the first direction is different from an inclination of a central axis of the reflected light.

* * * * *

UNITED STATES PATENT AND TRADEMARK OFFICE
CERTIFICATE OF CORRECTION

PATENT NO.    : 6,556,256 B1
DATED         : April 29, 2003
INVENTOR(S)   : Hisamaro Kato et al.

Figure 11B:
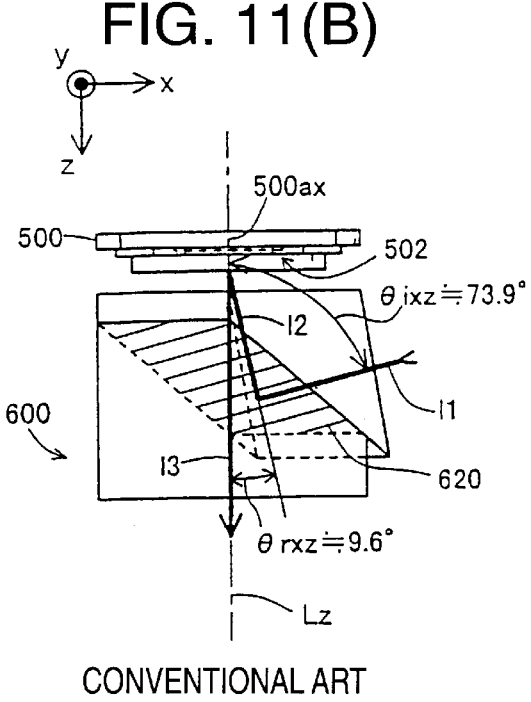
FIGS. 11(A)–(D) are diagrams illustrating the DMD and the prism of a conventional projector.
Figure 11D:
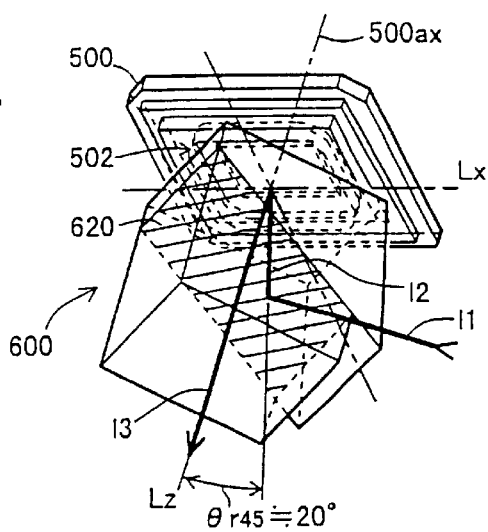
Figure 11A:
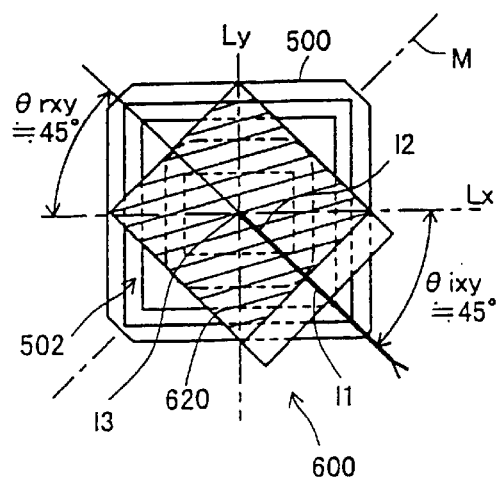
Figure 11C:
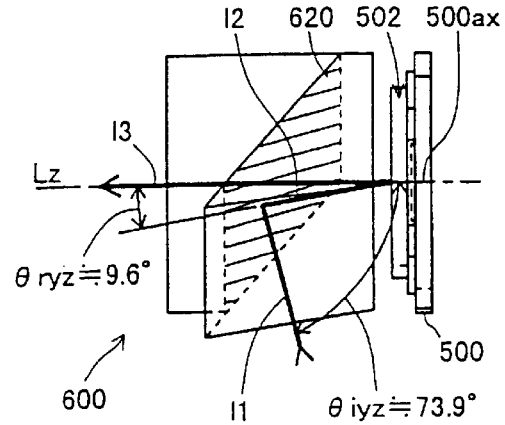
Figure 9C:
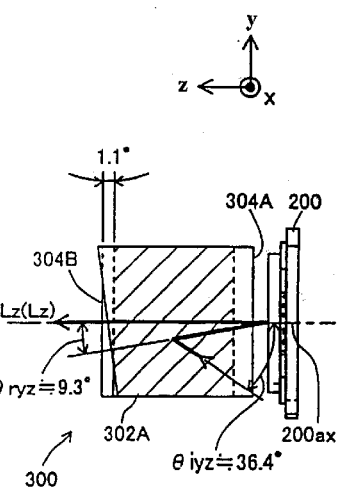

It is certified that error appears in the above-identified patent and that said Letters Patent is hereby corrected as shown below:

Drawings,
Please correct Figs. 9(c) and 11(c) with the new Fig. 9(c) and 11(c) by replacing sheets 9 of 11 and 11 of 11 with the attached sheets hereto.

Column 10,
Line 7, please change (not shown) to -- 700 --.

Signed and Sealed this

Sixteenth Day of September, 2003

JAMES E. ROGAN
*Director of the United States Patent and Trademark Office*

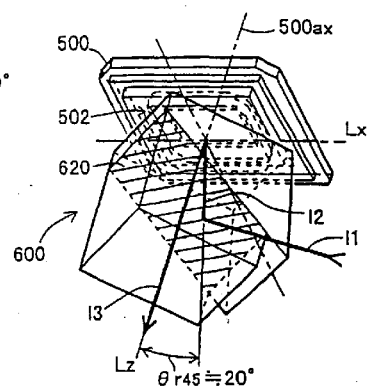
FIG. 11(B)
CONVENTIONAL ART
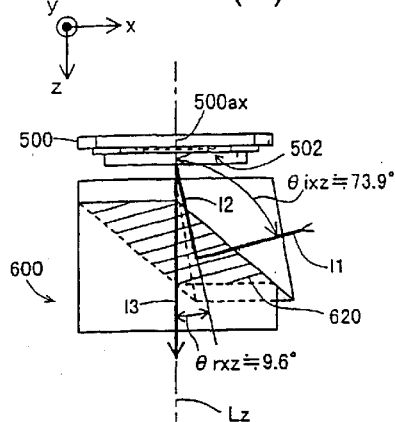
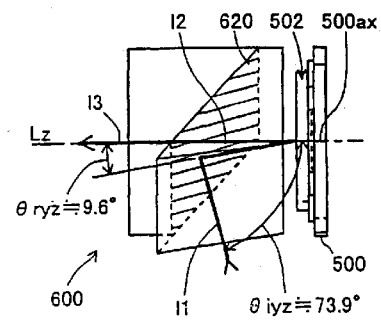
FIG. 11(D)
CONVENTIONAL ART
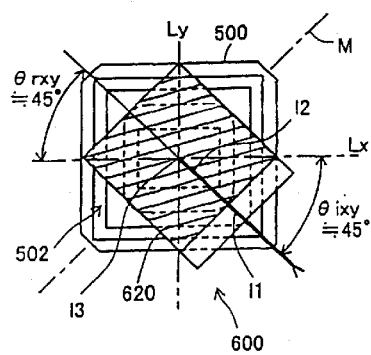
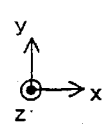
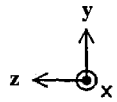
FIG. 11(A)
CONVENTIONAL ART
FIG. 11(C)
CONVENTIONAL ART